Figure 1:
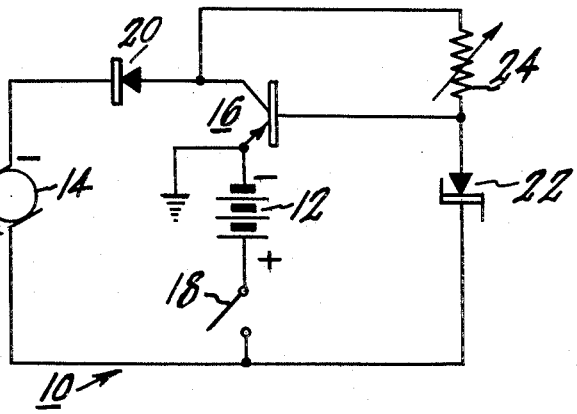

Jan. 7, 1964     L. PENSAK     3,117,269

BATTERY CHARGING CIRCUITS

Filed Dec. 9, 1960

INVENTOR.
Louis Pensak
BY
Morris␣Rabkin
ATTORNEY

United States Patent Office 3,117,269
Patented Jan. 7, 1964

3,117,269
BATTERY CHARGING CIRCUITS
Louis Pensak, Princeton, N.J., assignor to Radio Corporation of America, a corporation of Delaware
Filed Dec. 9, 1960, Ser. No. 74,843
5 Claims. (Cl. 320—40)

This invention relates generally to battery charging circuits, and more particularly to improved battery charging circuits employing semiconductor devices to control the charging rate of a battery in accordance with the state of charge of the battery. The improved battery charging circuits of the present invention are particularly useful in automobiles for charging the batteries therein.

In most conventional automobiles, the battery is charged by a D.-C. (direct-current) generator. The charging voltage and the charging rate are controlled by a regulator employing relays. The contact points of these relays are subject to continuous sparking and burning, and this action results eventually in the failure of the regulator and of the batter charging system.

Accordingly, it is an object of the present invention to provide improved battery charging circuits that obviate the aforementioned disadvantage of relays.

Another object of the present invention is to provide improved battery charging circuits that employ semiconductor devices to regulate the charging of batteries in automobiles.

A further object of the present invention is to provide improved battery charging circuits that are relatively simple in construction, very reliable in operation, and highly efficient in use.

Briefly stated, the improved charging circuits of the present invention comprise means to charge a battery at a predetermined, rapid rate when the battery is substantially discharged, and at a lower rate that reduces to substantially zero as the battery becomes fully charged. The charging means in each of the charging circuits comprise a transistor and a bias resistor therefor to limit the charging current through the transistor until the battery is substantially charged. Since the voltage of a battery increases as it becomes charged, a constant voltage device, such as a Zener diode chosen to have a breakdown voltage equal to that of a substantially fully charged battery, is connected to bias the transistor into a substantially non-conducting state when the battery becomes fully charged. The bias resistor and the Zener diode are connected in series with a source of charging voltage, and the bias resistor is connected in the base circuit of the transistor. The bias transistor functions to limit the maximum charging rate and to prevent the Zener diode from conducting while the battery is being charged. When the battery is fully charged, the resulting decrease in the voltage across the bias resistor causes an increased portion of the voltage from the source of charging voltage to be applied across the Zener diode and the latter is caused to conduit. In its conducting state, the Zener diode biases the transistor to a substantially cut-off state, thereby reducing the charging current to substantially zero and preventing the battery from becoming overcharged. If the battery becomes discharged and the voltage across it decreases, the charging current will flow through the battery again until its voltage becomes substantially equal to that of the Zener diode.

Figure 2:
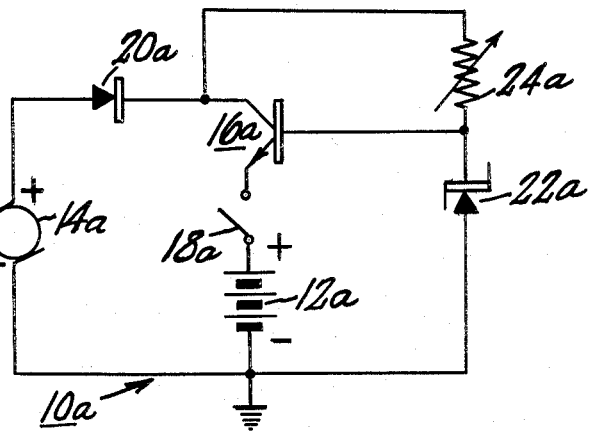

The novel features of the invention, both as to its organization and method of operation, as well as additional objects and advantages thereof, will be understood more readily from the following description, when read in connection with the accompanying drawing, wherein similar reference numerals are applied to similar circuit elements throughout, and in which:

FIGURE 1 is a shematic diagram of one form of improved battery charging circuit in accordance with the present invention; and
FIGURE 2 is another embodiment of the battery charging circuit in accordance with the present invenion.

Referring, now, particularly to FIG. 1, there is shown a battery charging circuit 10 for charging a battery 12 from a voltage source, such as a D.-C. generator 14. The battery 12 may be an automobile battery, and the generator 14 may be one of the type commonly found in automobiles. The negative terminal of the battery 12 is connected to the emitter of a PNP transistor 16. The negative terminal of the battery 12 is also connected to a common connection, such as the metal chassis of the automobile.

The positive terminal of the battery 12 is connected to the positive terminal of the generator 14 through a single pole switch 18. In an automobile, the switch 18 would be cooperatively associated with the ignition switch. The collector of the transistor 16 is connected to the negative terminal of the generator 14 through a diode 20. The diode 20 is poled to permit charging current to flow only in the direction from the generator 14 to the battery 12 to charge the latter. The diode 20 may be omitted if the transistor 16 can withstand the back voltage when the generator voltage is lower than the battery voltage.

Means are provided to bias the transistor 16 in a forward direction. To this end, the anode of a Zener diode 22 is connected directly to the base of the transistor 16, and the cathode of the Zener diode 22 is connected to the positive terminal of the generator 14. The base of the transistor 16 is connected to the collector through a variable bias resistor 24. When the Zener diode 22 is conducting, as when the voltage across it is sufficient to fire it, the voltage across it is substantially equal to the voltage of the battery 12 when the latter is fully charged.

The operation of the battery charging circuit 10 of FIG. 1 will now be described. Let it be assumed that the battery 12 is discharged, and that the difference in voltages between that of the discharged battery 12 and that of the generator 14 is relatively large. When the switch 18 is closed, charging current flows from the positive terminal of the generator 14, through the battery 12, through the emitter-collector path of the transistor 16, through the diode 20, and to the negative terminal of the generator 14. Current of a relatively large amplitude also flows in the base circuit from the base to the collector through the resistor 24. Under these conditions, the Zener diode 22 does not conduct because the difference in voltages between that of the generator 14 and that across the resistor 24 is smaller than the breakdown voltage of the Zener diode 22. As the battery 12 becomes charged, that is, as the voltage across the battery 12 increases, the emitter of the transistor 16 becomes more negative with respect to the base, and the current through the resistor 24 decreases. When the battery 12 is substantially charged, the Zener diode becomes conductive because the voltage drop across the resistor 24 has decreased and more of the voltage from the generator 14 is applied across the Zener diode 22. Under these conditions, the voltage at the base is substantially equal to the voltage at the emitter, and charging current to the battery 12 is reduced to substantially zero.

Referring, now, to FIG. 2, there is shown another embodiment of the present invention. A battery charging circuit 10a employs an NPN transistor 16a as the semiconductor control device, instead of the PNP transistor 16 in the circuit illustrated in FIG. 1. A generator 14a is connected in series with a diode 20a, the emitter-collector path of the transistor 16a, a switch 18a, and a battery 12a so as to cause current to flow through the battery 12a to charge the latter. Bias means, comprising a Zener diode 22a and a variable resistor 24a connected in series therewith, are connected across the generator 14a, the base of the transistor 16a being connected to the junction of the Zener diode 22a and the resistor 24a. The negative terminal of the battery 12a is connected to a common terminal, as is conventional in most automobiles.

The operation of the battery charging circuit 10a illustrated in FIG. 2 is substantially similar to the operation of the battery charging circuit 10 illustrated in FIG. 1. To charge the battery 12a, the switch 18a is closed. When the battery 12a is discharged, the voltage at the base of the transistor 16a is more positive than the voltage at the emitter, the voltage at the base being substantially that at the collector when the Zener diode is not conducting. Charging current then flows from the generator 14a to the battery 12a to charge the latter. During this charging period, current flows through the resistor 24a from the base to the collector, causing a relatively large voltage drop across the resistor 24a. Under these conditions, the Zener diode 22a does not conduct. As the battery 12 becomes charged, the voltage across it increases, and the transistor base current through the resistor 24a decreases. Since the generator voltage is applied across the serially connected Zener diode 22a and resistor 24a, the voltage of the Zener diode 22a increases as the voltage across the resistor 24a decreases, assuming the generator voltage remains substantially unchanged. When the battery 12a is substantially charged, the Zener diode 22a becomes conductive and biases the transistor 16a to a substantially cut-off state, thereby preventing the battery 12a from becoming overcharged.

It will be noted that when the battery 12a is relatively discharged, relatively more current flows through the emitter-collector path of the transistor and through the bias resistor 24a. As the battery 12a comes up to full charge, charging current through the emitter-collector path decreases, and, consequently, base current through the resistor 24a of the bias means also decreases. This latter action causes the Zener diode 22a to break down, that is, to become conductive. The resistor 24a is made variable so that it may be adjusted to compensate for the different amplification factors of the transistors that may be employed. When the battery 12a is fully charged, the biasing voltage at the base of the transistor 16a is that across the fired Zener diode 22a. If the battery 12a were to become discharged again, the reduced voltage across the battery 12a would bias the transistor 16a into a conductive state and cause charging current to flow once more to the battery 12a.

From the foregoing description, it will be apparent that there have been provided improved battery charging circuits wherein the charging rate of the battery is controlled by semiconductor devices in accordance with the state of charge of the battery. While only two embodiments of this invention have been described and illustrated, variations of the battery charging circuits coming within the spirit of this invention will, no doubt, readily suggest themselves to those skilled in the art. For example, the diodes 20 and 20a may be omitted if the transistors employed can withstand the back voltage when the generator voltage is below the battery voltage. Hence, it is desired that the foregoing shall be considered as merely illustrative and not in a limiting sense.

What is claimed is:

1. A circuit for applying a voltage source to a battery to charge said battery with a current that decreases in amplitude as the battery is charged, said battery having two terminals, said circuit comprising a transistor having an emitter-collector path and a base, means to connect one of said terminals to said emitter-collector path, bias means, means to connect said bias means across said voltage source, said base being connected to said bias means, and means for applying said voltage source in series with said battery and said path to cause said transistor to conduct and to charge said battery, a portion of said bias means being connected between said base and the other terminal of said battery, said portion comprising a Zener diode having a breakdown voltage substantially equal to the voltage of said battery when charged.

2. A circuit for charging a battery having positive and negative terminals, said circuit comprising a transistor having an emitter, a collector, and a base, means to connect said negative terminal to said emitter, bias means, means to connect said bias means between said positive terminal and said collector, said base being connected to said bias means, and means for applying a source of voltage between said positive terminal and said collector to cause current to flow through said transistor whereby to cause a charging current to flow through said battery, said bias means including between said base and said positive terminal a Zener diode having a breakdown voltage substantially equal to the voltage of said battery when charged.

3. A circuit for charging a battery having positive and negative terminals, said circuit comprising a transistor having an emitter, a collector, and a base, means to connect said positive terminal to said emitter, bias means, means to connect said bias means between said collector and said negative terminal, means connecting said base to said bais means, and means for applying a charging voltage between said collector and said negative terminal to cause current to flow through said transistor whereby to cause a charging current to flow through said battery, said bias means between said base and said negative terminal comprising a Zener diode.

4. A circuit for charging a battery from a source of voltage, said circuit comprising a transistor having an emitter, a collector, and a base, means to connect said battery in a series circuit with said source and the emitter-collector path of said transistor, resistive bias means, means connecting said resistive bias means between said base and said collector, a Zener diode, and means connecting said Zener diode between said base and the terminal of said battery remote from said path, said Zener diode having a breakdown voltage substantially equal to the voltage of said battery when said battery is substantially charged.

5. A circuit for charging a battery having positive and negative terminals, said circuit comprising a transistor having a base, an emitter, and a collector, means connecting one of said terminals of said battery to said emitter, means connecting said collector and the other of said battery terminals in a series circuit for connection across a source of charging voltage, a resistor connected between said collector and said base, and an element connected between said base and said other battery terminal, said element being voltage responsive to reduce its resistance to current flow above a given voltage whereby, when the voltage across said battery is less than normal, said voltage responsive element has one value of resistance and said transistor is biased for conduction for battery charging, and whereby, when the said battery voltage is normal, said voltage responsive element has a reduced value of resistance and back biases said transistor for substantially non-conduction to prevent battery charging current flow.

References Cited in the file of this patent

UNITED STATES PATENTS 2,876,366    Hussey _____ Mar. 3, 1959
2,897,430    Winkel _____ July 28, 1959

UNITED STATES PATENT OFFICE
CERTIFICATE OF CORRECTION

Patent No. 3,117,269 January 7, 1964

Louis Pensak

It is hereby certified that error appears in the above numbered patent requiring correction and that the said Letters Patent should read as corrected below.

Column 1, line 50, for "transistor" read -- resistor --; line 57, for "conduit" read -- conduct --; line 62, strike out "the", first occurrence; column 2, line 1, for "shematic" read -- schematic --; column 4, line 29, for "bais" read -- bias --.

Signed and sealed this 9th day of June 1964.

(SEAL)
Attest:

ERNEST W. SWIDER
Attesting Officer

EDWARD J. BRENNER
Commissioner of Patents